United States Patent [19]

Blackwell, Jr.

[11] Patent Number: 4,770,219

[45] Date of Patent: Sep. 13, 1988

[54] ADZER HEAD ASSEMBLY

[76] Inventor: George T. Blackwell, Jr., P.O. Box 278, Oneonta, Ala. 35121

[21] Appl. No.: 885,673

[22] Filed: Jul. 15, 1986

[51] Int. Cl.⁴ .................. B22G 13/00; B26D 1/12
[52] U.S. Cl. ...................... 144/228; 144/218; 144/241; 407/7; 407/48; 407/113
[58] Field of Search .............. 407/7, 48, 113; 144/133 R, 134 R, 218, 219, 228, 231, 241

[56] References Cited

U.S. PATENT DOCUMENTS

| | | | |
|---|---|---|---|
| 2,785,714 | 3/1957 | Simmons et al. | 144/228 |
| 3,237,275 | 3/1966 | Middleton | 144/229 |
| 3,486,542 | 12/1969 | Blackwell | 144/218 |
| 4,315,706 | 2/1982 | Erkfritz | 407/113 |
| 4,506,715 | 3/1985 | Blackwell | 144/218 |

Primary Examiner—W. D. Bray
Attorney, Agent, or Firm—Thomas & Kennedy

[57] ABSTRACT

Adzer bit assemblies (18) are of noncircular outer surface configuration and have a noncircular surface seated against a face (15) of similar noncircular shape to hold the assembly against rotation. When becoming worn, the adzing bit assembly can be loosened from the adzing head (99), and rotated to present a fresh cutting surface.

12 Claims, 3 Drawing Sheets

ADZER HEAD ASSEMBLY

BACKGROUND OF THE INVENTION

This invention relates in general to adzing apparatus of the type normally used in railroad crosstie cutting. Adzing machines are used to cut grooves in the top surfaces of crossties that facilitate the proper placement of rails onto the crossties.

Normally the adzing apparatus is moved across the crossties with an adzing head fixed to a rotating vertical shaft, the head having a plurality of cutting bits which contact the top surface of the crossties. The cutting bits are arranged to rotate in a horizontal plane which, due to the rotary action of the adzing head, produces a flat groove in the crosstie when cutting is complete. The cutting bits gradually wear down during use and eventually, after a number of crossties have been cut, the cutting edge becomes unacceptable. In prior art, an operator will rotate the circular cutting bit at this point to present a new cutting edge. This usually is done at the same time to each cutting bit on an adzing head assembly. U.S. Pat. Nos. 3,005,479, 3,486,542 and 4,506,715 illustrate various known adzing apparatus.

The workman must be careful when rotating a partially worn cutting bit so as to rotate only the worn part of the cutting bit out of the cutting position, thereby preserving the maximum amount of unworn cutting edge for a later time. Also, if the cutting bit assembly is not properly tightened after its adjustment, the cutting bit is prone to rotate away from the new cutting edge, causing a rough cutting action and non-uniform grooves.

This invention is aimed at improving the inexact method of changing cutting edges. Utilizing a square or other noncircular cutting bit and mounting fixture, each new cutting edge can be presented to the work piece in the same orientation as the previous cutting edge, easily and accurately. Also a cutting bit shield of similar noncircular shape is fixed to the cutting bit to provide protection for each of the cutting edges. A shield concept applied to a circular cutting bit is known in prior art, as described in U.S. Pat. No. 4,506,715.

SUMMARY OF THE INVENTION

Briefly described, this invention comprises an improved adzing head assembly for cutting grooves in the top surfaces of railroad crossties which includes durable cutting bits of noncircular shape, each of which can be oriented to a predetermined set position so as to present a cutting edge of predetermined size, shape and position to the crosstie. The noncircular shape of the cutting bit and its related elements allows the noncircular shapes to be received in seats on the adzing head so as to maintain the adzing bit in its preset position.

More particularly, the adzing head assembly has a central opening surrounded by center hub designed to accept a vertical drive shaft from the adzing apparatus. A plurality of support arms are spaced equally circumferentially around the center hub and extend outward radially. Each support arm has a through bore and flat face located near its distal end used for mounting an adzing bit assembly. A connector is passed through this through bore and has the adzing bit assembly mounted on it, including the cutter mounting fixture, the cutting bit, the cutting bit shield and washer cap. When the connector is tightened down, the locating edges on the cutter mounting fixture engage the flat face on the support arm in a manner that renders the cutter mounting fixture unrotatable. The cutting bit and cutting bit shield are mounted rigidly onto this cutter mounting fixture, therefore they also become unrotatable. The washer cap serves as a bearing point for the connector.

The flat face used for mounting the adzing bit assembly has a recessed mounting surface and a locating surface which positions the cutting edge of the cutting bit at an 8° angle to the support arm. This angle has been determined to be the most appropriate cutting angle for this application; however, other angles are usable to achieve similar results. The cutter mounting fixture seats in and engages the locating surface a distance of $\frac{1}{4}$ inch. This then becomes the distance the connector must be loosened to allow the cutter mounting fixture and cutting bit to be rotated to present a fresh cutting edge when the previous one has been worn. Once all four cutting edges on each cutting bit have been used, the connectors can be loosened completely to allow the entire cutting bit assemblies to be removed and replaced with new ones.

Upon review of this construction, it is easily seen that holding a square cutter rigidly at a fixed angle is advantageous to this cutting procedure.

Thus, it is an object of this invention to provide an improved adzing head assembly for cutting grooves in the upper surfaces of railroad crossties wherein adzing bit assemblies of noncircular shape are nonrotatably seated on an adzing head, and when the adzing bits become worn, the adzing bit assemblies can be loosened, rotated a predetermined angle and then reseated so as to present a new cutting surface of predetermined size, shape and position to the crossties.

Another object of this invention is to provide an improved adzing head assembly which includes a plurality of adzing bit assemblies of noncircular shape that are mounted to an adzing head in receptacles of corresponding shape so that the adzing bit is securely maintained in a fixed position during operation of the adzing apparatus.

These and other advantages, features, and objects of the present invention can be be understood by reference to the following description thereof together with the drawings in which:

BRIEF DESCRIPTION OF THE DRAWINGS

FIG. 1 is a plan view of the adzing head assembly with one of the adzing bit assemblies shown assembled to one of the four support arms and one adzing bit assembly shown telescopically exploded for clarity.

DETAILED DESCRIPTION

Figures 5A, 5B:
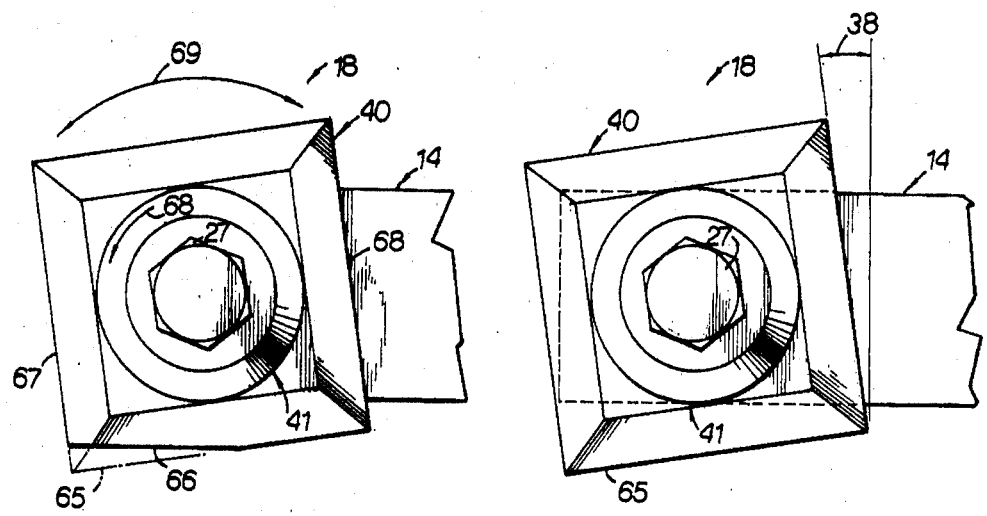
FIG. 5a and 5b are front views of the adzing bit assembled onto the support arm before and after use, respectively.
Figure 4:
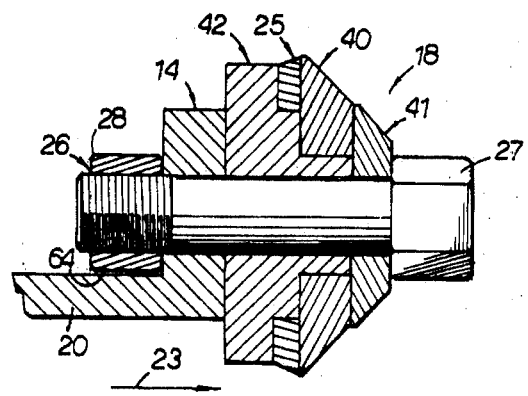

Referring now in detail to the drawings in which like numerals indicate like parts throughout all views, FIG. 1 shows the adzing head assembly 10 which includes an adzing head 9 with axis of rotation 12. The central opening 11 surrounded by the center hub 13 are coaxial with the axis of rotation 12 of the adzing head, and a plurality of support arms 14 extend radially outward from the center hub 13. The support arms 14 are spaced equally around the circumference of center hub 13 and a through bore 16 is located at the distal end 17 of each support arm 14. Each through bore 16 is cylindrical with a longitudinal axis perpendicular to both the axis of rotation 12 and the support arm center line 35. Each support arm 14 has a leading edge 22 and a trailing edge 21 parallel with the support arm center line 35, with the leading edge 22 having a flat face 15 located centrally around the through bore 16. The flat face 15 has a recessed mounting surface 36 which is parallel to the leading edge 22, and a locating surface 37 which is perpendicular to the leading edge 22, the locating surface 37 also being oriented at a cutting angle 38 of 8° to the axis of rotation 12 as seen in FIG. 5A. A web 20 extends from the trailing edge 21 to leading edge 22 of adjacent support arms 14 to act as a brace.

The adzing head assembly 10 in FIG. 1 is shown with a cutter head 9 having four support arms 14, with one of the support arms 14 having an adzing bit assembly 18 mounted on its flat face 15. Another adzing bit assembly 18 in FIG. 1. is shown telescopically expanded for clarity, with a perspective view of the same represented by FIG. 3. Each adzing bit assembly 18 includes a cutting bit 25, cutting bit shield 40, washer cap 41 and cutter mounting fixture 42 held together rigidly by a connector 26.

The connector 26 includes nut member 28 and bolt member 27 consisting of an elongated stem 29 with helical threads and an enlarged noncircular head 30.

The cutting bit 25 has first and second parallel surfaces 43 and 44, second parallel surface 44 having four cutting edges 24 equal in length forming a square. The first parallel surface 43 also has four cutting edges 45 equal in length but slightly shorter than cutting edges 24 such that four tapered cutting surfaces 46 extend between each of the four sets of cutting edges 24 and 25. The cutting bit 25 has a circular mounting opeing 47 extending therethrough centrally located from the four cutting edges 24.

The cutting bit shield 40 consists of a first mounting side 48 equal in size and shape to the cutting bit second parallel surface 44, a second mounting side 49 of a square shape smaller than the first mounting side 48 such that tapered shield surfaces 50 are formed. A circular mounting hole 63, of somewhat smaller diameter than the circular mounting opening 47 of cutting bit 25, extends centrally through the cutting bit shield 40.

Cutter mounting fixture 42 has a boss 51 with four equal locating edges 52 formed at right angles with bearing surface 53 and front mounting surface 54, a circular hub 55 including outer perimeter 56 and shield surface 57, and a setp down hub 71 coaxial with hub 55 including outer perimeter 72 and cap surface 73 which surface 54. Mounting hole 58 extends centrally throughout cutter mounting fixture 42 at right angles to bearing surface 53 and cap surface 57.

Washer cap 41 has large and small parallel circular surfaces 59 and 60 in proportions such that outer washer surface 61 is conical in shape and a step-down hub bore 62 extends centrally therein and perpendicular to circular surfaces 59 and 60.

The through bore 16 and fixture mounting hole 58 are of a uniform diameter being slightly larger than the helical threads of elongated stem 29. Circular mounting opening 47 is slightly larger than the outer perimeter 56 to provide a "slip-fit" of cutting bit 25 onto circular hub 55. Cutting bit shield 40 and step-down hub 71 have a "press-fit" relationship provided by circular mounting hole 63 having a diameter slightly smaller than outside perimeter 72. The length of the circular hub 55 is equal to the thickness of cutting bit 25 and the length of step-down hub 71 is equal to the thickness of cutting bit shield 40 to provide a "flush" relationship between cap surface 73 and second mounting side 49 when the cutting bit 25 and cutting bit shield 40 are mounted on cutter mounting fixture 42.

The elongated stem 29 is of a length such that as bolt member 27 is passed through washer cap 41, cutting bit shield 40, cutting bit 25, cutter mounting fixture 42 and through bore 16 opposite end 32 will be protruding out from the trailing edge 21 of support arm 14 an amount sufficient for nut member 28 to engage the helical threads of bolt member 27 completely and secure the adzing bit assembly 18.

Figure 4:
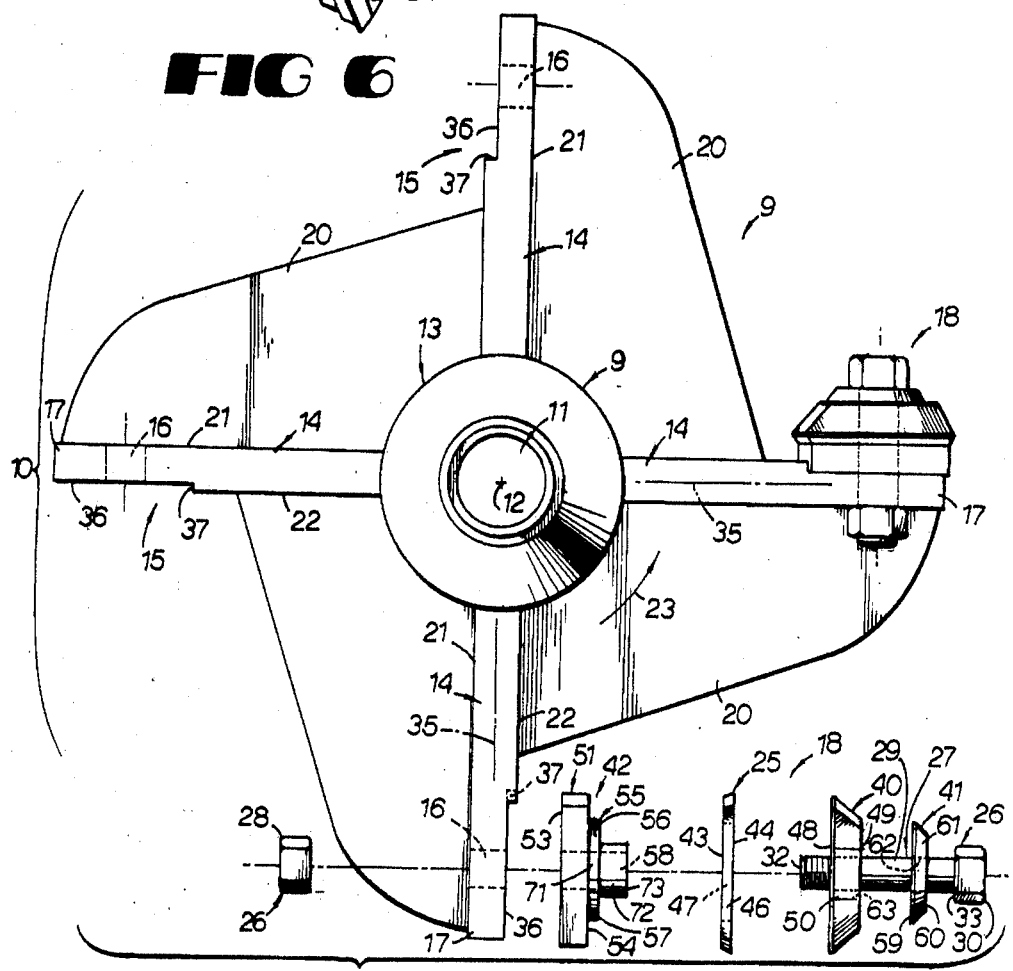
FIG. 4 is a cross-sectional side view of the adzing bit assembly mounted on the support arm.
Figure 2:
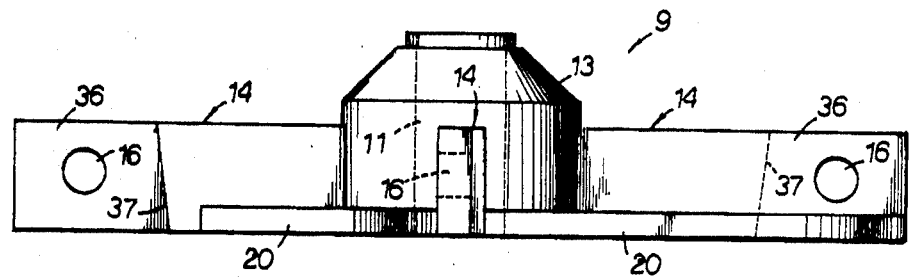
FIG. 2 is a side view of the adzing head shown without the adzing bit assemblies mounted to it.
Figure 3:
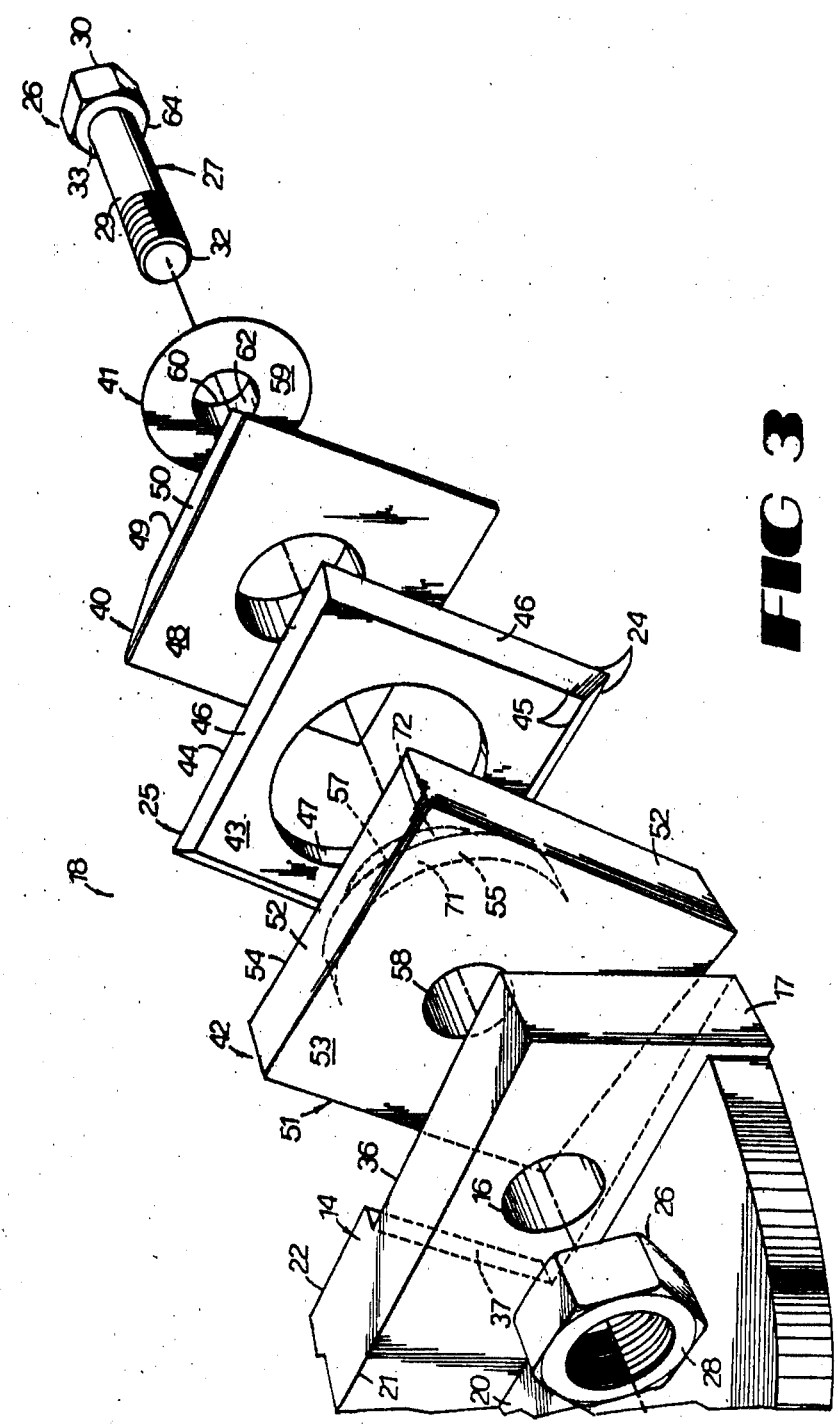
FIG. 3 is a perspective expanded illustration of an adzing bit assembly according to the present invention.

When the adzing bit assembly 18 (as seen in FIGS. 1, 3 and 4) is mounted on a support arm 14, cutter mounting fixture 42 will have bearing surface 53 abutting mounting surface 36, with one of the locating edges 52 secured against locating surface 37. Mounting hole 58 will be concentric with through bore 16, and bolt member 27 will extend therebetween. Cutting bit 25 will be mounted about circular hub 55 with the first parallel surface 43 pushed against front mounting surface 54 and silver solder applied between these two surfaces to provide a nonrotatable connection. Cutting bit shield 40 will be positioned about step-down hub 71 such that first mounting side 48 is in flush contact with second parallel surface 44 and shield surface 57 with the circular mounting hole 63 being "press fit" over the outer perimeter 72 of step-down hub 71. The cutting bit 25, cutting bit shield 40 and cutter mounting fixture 42 are joined together such that locating edges 52, cutting edges 24 and tapered shield surfaces 50 are all parallel and remain so when fixed. Washer cap 41 is located on bolt member 27 with large circular surface 59 in contact with second mounting side 49 and tapered shield surfaces 50. The nut member 28 is threaded onto the opposite end 32 of bolt member 27 until it is tight and has secured the entire adzing bit assembly 28. With the adzing bit assembly 18 secured, positioning flat 64 on nut member 28 will be in close contact with web 20 thereby retaining nut member 28 in a fixed rotary attitude.

Figure 6:
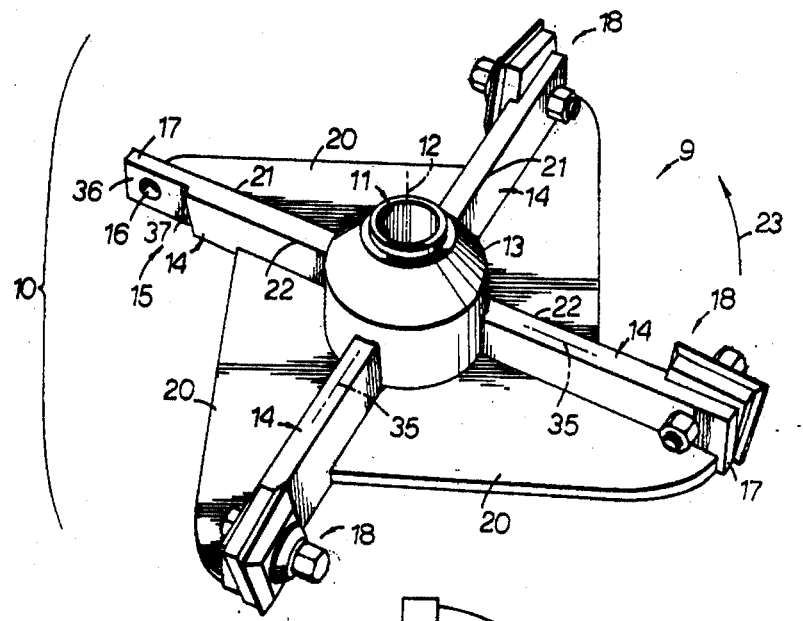
FIG. 6 is a perspective view of the adzing head assembly with one of the adzing bit assemblies removed to show an end portion of one of the support arms.

The entire adzing head assembly 10 is rotated in the direction of arrow 23 seen in FIGS. 1 and 6 around its axis of rotation 12 with the active cutting edges 65 seen in FIG. 5a forming a cutting plane that is perpendicular to the axis of rotation 12. As seen in FIG. 5b, an active cutting edge 65 gradually becomes worn during use until it resembles the unacceptable cutting edge 66. When this occurs, a fresh cutting edge 67 can be easily introduced by turning the bolt member 27 in the direction of the rotation arrow 68. This action then allows the cutter mounting fixture 42 to be slid away from the flat face 15 freeing the locating edges 52 from the locating surface 37. Rotation of the cutting bit 25 in either direction represented by cutter bit rotation arrow 69 introduces a fresh cutting edge 67 to the work surface. Once the new cutting edge is in place, rotation of bolt member 27 in a direction opposite of rotation arrow 68 resecures the adzing bit assembly. When all four cutting edges 24 have been worn, the bolt member 27 can be disengaged completely from nut member 28 allowing the washer cap 41, cutting bit shield 40, cutting bit 25 and cutter mounting fixture 42 to be disassembled. A new cutting bit 25 and shield 40 and possibly other worn elements of the assembly can then be mounted on each support arm 14 of the cutter head 9 and work can be continued.

As illustrated in FIG. 4, the cutting bit shield 40 will meet the work piece prior to the cutting edge 24 of cutting bit 25 when the adzing head assembly 10 is rotated in the direction of arrow 23. Because the cutting bit shield 40 is made of a mild steel, such as C1018, it will proceed to wear away much quicker than the cutting bit 25 which is made of carbide steel. The cutting bit shield 40 is a protective device for cutting bit 25 which because of the brittle nature of carbide steel, is subject to cracking or breakage upon severe impacts often associated with railroad cross tie cutting. As mentioned earlier, the cutting bit 25 is silver soldered to cutter mounting fixture 42 and cutting bit shield 40 is press fit onto the step-down hub 71 of cutter mounting fixture 42. The result of this is a unified cutting structure in which none of the three component parts can rotate relative to each other or with respect to the support arm 14 of the cutter head 9 during normal cutting operation.

Although the cutting bit and related elements of the adzing bit assembly have been illustrated and described as being square, it is anticipated that other noncircular shapes will be useful in practicing the invention, and the invention is not to be considered as including only square cutting bits and related components.

Further, while this invention has been described in detail with particular reference to a preferred embodiment thereof, it will be understood that variations and modifications can be effected within the spirit and scope of the invention as described hereinbefore as defined in the appended claims.

I claim:

1. An adzing head assembly of the type utilized to cut railroad cross ties comprising:
   a cutter head including an axis of rotation normally extending in an upright direction and a plurality of adzing bit support arms extending radially out from the axis of rotation, a through bore formed in the distal end of each of said support arms,
   an adzing bit assembly mounted at the distal end of each said support arm, each of said adzing bit assemblies comprising a cutting bit mounted adjacent a support arm, said cutting bit being formed of relatively hard material and including a noncircular outer perimeter with a plurality of similarly shaped equally spaced cutting edges formed about its perimeter and a centrally positioned mounting opening extending therethrough,
   a cutting bit shield mounted adjacent the cutting bit, said shield being formed of relatively soft material and including a noncircular outer perimeter which corresponds approximately in size and shape to the size and shape of the cutting edges at the outer perimeter of said cutting bit and a centrally positioned mounting opening extending therethrough,
   a connector extending through the bore of the support arm and through the mounting openings of said cutting bit and shield for mounting the cutting bit and shield to said support arm, and
   positioning means in cooperative relationshipo between said support arm and said cutting bit to hold said cutting bit in a nonrotatable fixed position on said support arm, said positioning means comprising a cutter mounting fixture including a bos having a noncircular outer perimeter which approximately corresponds in size and shape to the size and shape of the cutting edges at the outer perimeter of said cutting bit, and a hub extending from said boss, and an opening extending centrally through said boss and hub, said cutting bit and cutting bit shield being telescopically mounted about said hub, and said connector extending through the opening of said mounting fixture, and a protrusion carried by said support arm which conforms in shape and position to the noncircular outer perimeter of the boss of said mounting fixture to maintain said mounting fixture in a predetermined rotary attitude about its connector, and means nonrotatably connecting said cutting bit to said mounting fixture.

2. The improvement of claim 1 and wherein said means nonrotatably connecting said cutting bit to said mounting fixture comprises said mounting fixture and said cutting bit being soldered together.

3. The invention of claim 1 and wherein said support arm includes an abutment surface spaced from its through bore, and said connector comprises a bolt member including an elongated stem and an enlarged noncircular head at one end of said stem and a nut member of predetermined size such that when the stem of said connector is inserted in said through bore of said support arm, the nut member of said connector is in cooperative relationship with said abutment surface such that said nut member is held in a nonrotatable position.

4. The invention of claim 1 wherein said cutting bit is made of carbide steel and said cutting bit shield is made of mild steel.

5. The invention of claim 1 wherein the cutting bit has parallel oppositely faced surfaces, the first of said surfaces having an outer perimeter approximately the same size and shape as the size and shape of the outer perimeter of said boss, the second of said surfaces having an outer perimeter larger than said first surface outer perimeter with tapered cutting surfaces extending therebetween, such that acute angle cutting edges are formed between the said second surface and said tapered cutting surfaces.

6. The invention of claim 5 and wherein said cutting bit shield has oppositely faced parallel surfaces, the first said surface positioned in abutment with the second surface of said cutting bit and having an outer perimeter approximately the same size and shape as the size and shape of the outer perimeter of said cutting bit second surface, the second cutting bit shield surface having an outer perimeter smaller than the said first cutting bit shield outer perimeter with connecting surfaces extending between said outer perimeters, and acute angles are formed by said cutting bit shield first surface and said connecting surfaces.

7. The invention of claim 5 and wherein said boss has a flat front surface extending outwardly from said hub and the front surface of the said boss and the said cutting bit first surface are in flush contact.

8. The invention of claim 6 and wherein said cutting bit second surface and said cutting bit shield first surface are in flush contact.

9. The invention of claim 1 and wherein said hub has an outer perimeter of dimension such that when said cutting bit shield is mounted on said hub, a press fit relationship exists between said hub outer perimeter and the mounting opening of said cutting bit shield.

10. The invention of claim 3 and wherein the stem of said bolt member includes helical threads, and said nut member is in threaded engagement with said threads at a position on said stem remote from the noncircular head, and the relationship existing between said nut, said connector and said cutting bit is such that said bolt member can be intentionally loosened a small amount which allows said cutting bit to be displaced from said support arm and rotated to present a fresh cutting edge when one of said cutting edges becomes worn.

11. The invention of claim 3 and wherein said abutment surface comprises a web that extends between adjacent support arms and acts as a brace between said support arms.

12. An adzer head assembly of the type utilized to cut railroad crossties comprising:

a cutter comprising an axis of rotation normally extending in an upright direction and a plurality of adzing bit support arms extending radially outward from said axis of rotation, at least one through bore formed in each said support arm, at least one adzing bit assembly mounted on each said support arm, each of said adzing bit assemblies comprising a cutting bit, said cutting bit including an outer perimeter comprised of a plurality of similarly shaped cutting edges formed thereon, and a plurality of locating surfaces attached to said cutting bit around its perimeter and adjacent said support arm, a shield member mounted adjacent each of said cutting edges, fastening means for mounting said cutting bit and said shield members to said support arm, and means for positioning said cutting bit and said shield members in a specific rotary attitude comprising abutment surfaces on said support arms which conform in shape and position to said locating surfaces and which engage the locating surfaces on said cutting bit when said fastening means is applied.

* * * * *